United States Patent [19]

Moore

[11] Patent Number: 4,758,014
[45] Date of Patent: Jul. 19, 1988

[54] TOWING ATTACHMENT

[76] Inventor: Matthew J. Moore, 1000 Laurel Ave., St. Paul Park, Minn. 55071

[21] Appl. No.: 93,177

[22] Filed: Sep. 3, 1987

[51] Int. Cl.⁴ ............................ B60D 1/06; B60P 3/12
[52] U.S. Cl. ................................. 280/402; 280/415 R; 414/563
[58] Field of Search .............. 280/402, 415 R, 415 A, 280/491 R; 414/563

[56] References Cited

U.S. PATENT DOCUMENTS 4,268,213  5/1981  Obbink ................................. 414/563
4,679,978  7/1987  Holmes ................................. 414/563

Primary Examiner—John A. Pekar
Attorney, Agent, or Firm—Thomas B. Tate

[57] ABSTRACT

The invention is a towing attachment which can be attached to the towbar of a towing vehicle in order to allow easier towing of trailers by moving into position under the trailer. The towing attachment can also be used to lift the towing vehicle off the ground with a tongue attachment for better traction in snow.

2 Claims, 3 Drawing Sheets

TOWING ATTACHMENT

SUMMARY AND BACKGROUND OF THE INVENTION

Tow trucks are equipped with a hydraulic towbar. With present equipment, it is difficult to tow trailers because conventional towbars cannot get underneath the trailer to provide the proper lift.

A primary object of the present invention is to solve this problem by providing a towbar attachment which can move in six directions to allow for easy towing of trailers.

Another object of the invention is to allow for better traction when towing vehicles in snow. The invention accomplishes this objective because the towbar attachment can also be used in a position which is sideways relative to its principal position (the position which is used when towing trailers).

DESCRIPTION OF THE INVENTION

Figure 1:
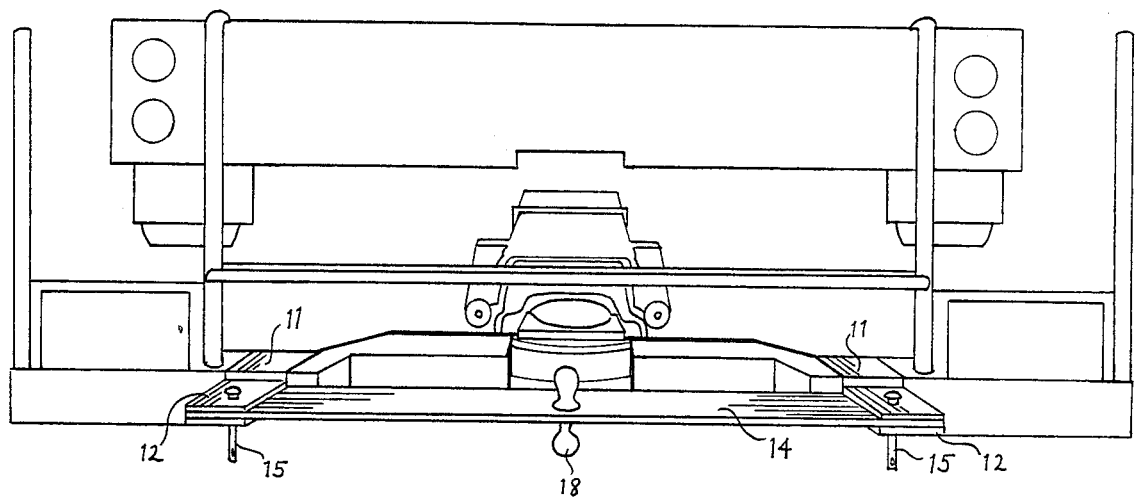
FIG. 1 is a front view of the towing attachment in place on the back of a towing vehicle.
Figure 2:
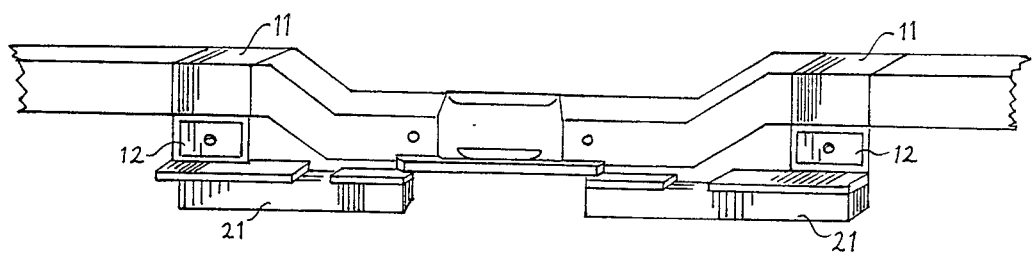
FIG. 2 is a front view of the second mode of the invention in place on the towbar of a towing vehicle.
Figure 3:
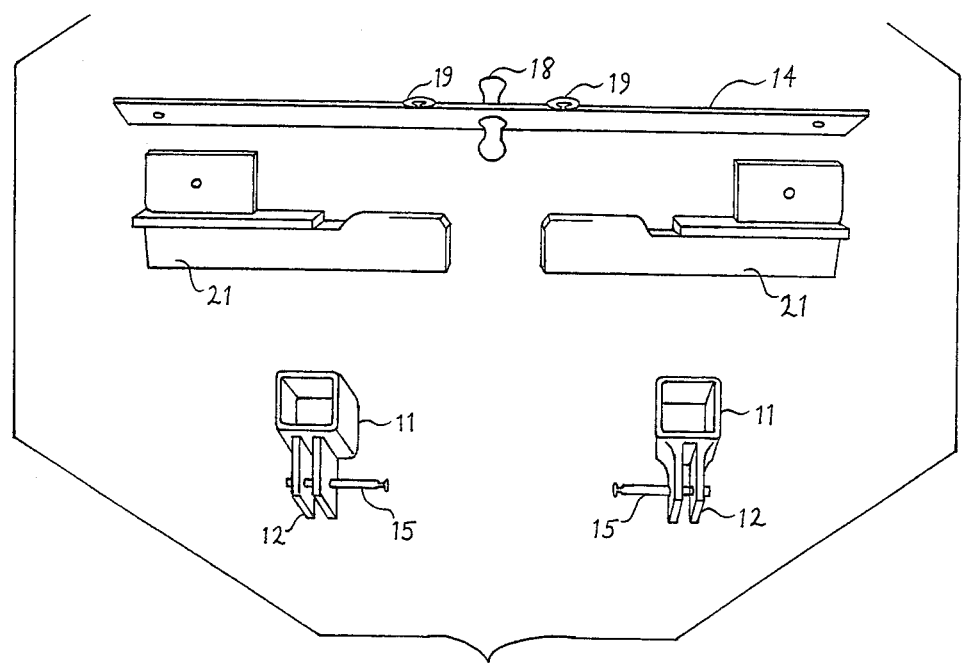
FIG. 3 is an exploded view showing the various components of the invention.

The invention is a towing attachment designed to be attached to the hydraulic towbar of a pickup truck or other conventional towing vehicle. This towing attachment is particularly well-suited for use in towing trailers, because it can move into position underneath the trailer and can cause the trailer to move in six different directions (in, out, up, down, back, and forth). The towing attachment can also be turned sideways to be used in a second mode, using the up and down pressure of the towbar to lift the tow truck off the ground with a tongue attachment which can bite into snow to provide better traction.

The structure of the towing attachment is as follows. Two generally rectangular tubing sleeves 11 fit over either end of the towbar. A pair of brackets 12 are welded to each of the sleeves 11, the brackets 12 being positioned beneath the sleeves 11 in vertical spaced relation to each other. A bar 14 fits between the brackets 12 and connects them to each other. A bolt 15 (or alternatively, rivets) is disposed vertically through openings in each of the brackets 12 and bar 14. A lock clip can be fit over the bottom end of each of the bolts 15. A ball 18 which extends above and below the center of the bar 14 is used as the hitching means for ball-hitch trailers. Two chain handles 19, one on either side of the ball 18, can be extended from the bar 14. The entire attachment can be swiveled to an angle of approximately 45 degrees from the horizontal in both directions.

In the second mode, the sleeves 11 are placed on the towbar sideways and the stop blocks 21 which are welded to the bottom of the brackets 12 rest upon the street. Rubber pads can be attached to the bottom of the base to prevent damage to the asphalt.

An alternative version, suitable for use with Army clamp or pin-type construction trailers (as opposed to ball-hitch trailers, for which the principal embodiment of the invention is best suited), features a tongue instead of a ball in the middle of the bar. The tongue, which has a hole formed in it, extends away from the tow truck and is removeable by pin means. Three bars (one horizontal, two vertical) are welded to the main bar. The pin is placed through the center of the whole bar arrangement.

I claim:

1. In combination with the conventional hydraulic towbar of a towing vehicle, a towing attachment comprising:

two generally rectangular tubing sleeves, one fitting over each end of said towbar;

a pair of brackets attached to each of said sleeves, said brackets being positioned beneath said sleeves in vertical spaced relation to each other;

a bar fitting between said brackets and connecting them to each other;

fastening means disposed vertically through openings in each of said brackets and said bar;

hitching means extending from the center of said bar to hitch said towing vehicle to the vehicle to be towed;

said towing attachment being capable of attaching underneath the bottom of a trailer said tow bar with said attachment being capable of moving said trailer in six directions: in, out, up, down, back, and forth.

2. The invention of claim 1 wherein said sleeves are placed upon said towbar sideways relative to the position described in claim 1, and wherein stop blocks attached to the underside of said brackets form a base capable of resting upon a road surface.

* * * * *